(12) United States Patent
Kwak

(10) Patent No.: US 7,720,103 B2
(45) Date of Patent: May 18, 2010

(54) DIGITAL TELEVISION RECEIVER AND METHOD FOR PROCESSING A DIGITAL TELEVISION SIGNAL

(75) Inventor: Won Gee Kwak, Daejeon (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 11/790,890

(22) Filed: Apr. 27, 2007

(65) Prior Publication Data

US 2007/0256109 A1 Nov. 1, 2007

(30) Foreign Application Priority Data

Apr. 28, 2006 (KR) ............ 10-2006-0039050

(51) Int. Cl.
*H04J 1/00* (2006.01)
(52) U.S. Cl. .......... 370/486; 370/536; 370/542; 725/151; 348/725
(58) Field of Classification Search .............. None
See application file for complete search history.

(56) References Cited

U.S. PATENT DOCUMENTS 6,473,129 B1 * 10/2002 Choi ............ 348/465
6,807,585 B2 * 10/2004 Kovacevic ........... 710/5
7,376,964 B1 * 5/2008 Kim ................ 725/50

FOREIGN PATENT DOCUMENTS

KR 10-2006-0022384 3/2006

OTHER PUBLICATIONS

ATSC, Implementation Guidelines for the ATSC Data Broadcast Standard (Doc. A/90), Advances Systems Committee, 122 pages, Jun. 2001.*

* cited by examiner

*Primary Examiner*—Frank Duong
(74) *Attorney, Agent, or Firm*—McKenna Long & Aldridge LLP

(57) ABSTRACT

A method of processing a digital television (DTV) signal in a DTV receiver, the method includes receiving a digital television signal including video streams and an event information table carrying information for events on predefined virtual channels; parsing the event information table, the parsed event information table comprising bit rate information defining one or more bit rates associated with video streams in the digital television signal; and processing the video streams according to the parsed bit rate information.

24 Claims, 5 Drawing Sheets

FIG. 1

| syntax | bits of number | format |
|---|---|---|
| event_information_table_section () { | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j = 0; j< num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N; i++) { | | |
|             descriptor() | | |
|         } | | |
|     } | | |
|     CRC_32 | 32 | rpchof |
| } | | |

FIG. 2A

| syntax | bits of number | format |
|---|---|---|
| Low_bit_rate_video_descriptor() {<br>  Descriptor_tag<br>  Descriptor_length<br>  reserved<br>  low_bit_rate_video_count<br>  for(I=0; i<low_bit_rate_video_count; i++) {<br>    bit_rate<br>    low_bit_rate_video_type<br>    reserved<br>    if(low_bit_rate_video_type==full frame)<br>      max_buffer_rate<br>    else<br>      min_buffer_rate<br>} | <br>8<br>8<br>2<br>6<br><br>16<br>6<br>2<br><br>16<br><br>16 | <br><br>uimsbf<br>'11'<br>uimsbf<br><br>uimsbf<br>uimsbf<br>'11'<br><br>uimsbf<br><br>uimsbf |

FIG. 2B

| syntax | bits of number | format |
|---|---|---|
| Low_bit_rate_video_descriptor() {<br>  Descriptor_tag<br>  Descriptor_length<br>  reserved<br>  low_bit_rate_video_count<br>  for(I=0; i<low_bit_rate_video_count; i++) {<br>    bit_rate<br>    low_bit_rate_video_type<br>    reserved<br>    if(low_bit_rate_video_type==full frame)<br>      max_buffer_rate<br>    else<br>      min_buffer_rate<br><br>  position_LeftTop_XY<br>  size_width_height<br>  aspect_ratio<br>} | <br>8<br>8<br>2<br>6<br><br>16<br>6<br>2<br><br>16<br><br>16<br><br>16<br>16<br>8 | <br><br>uimsbf<br>'11'<br>uimsbf<br><br>uimsbf<br>uimsbf<br>'11'<br><br>uimsbf<br><br>uimsbf<br><br>uimsbf<br>uimsbf<br>uimsbf |

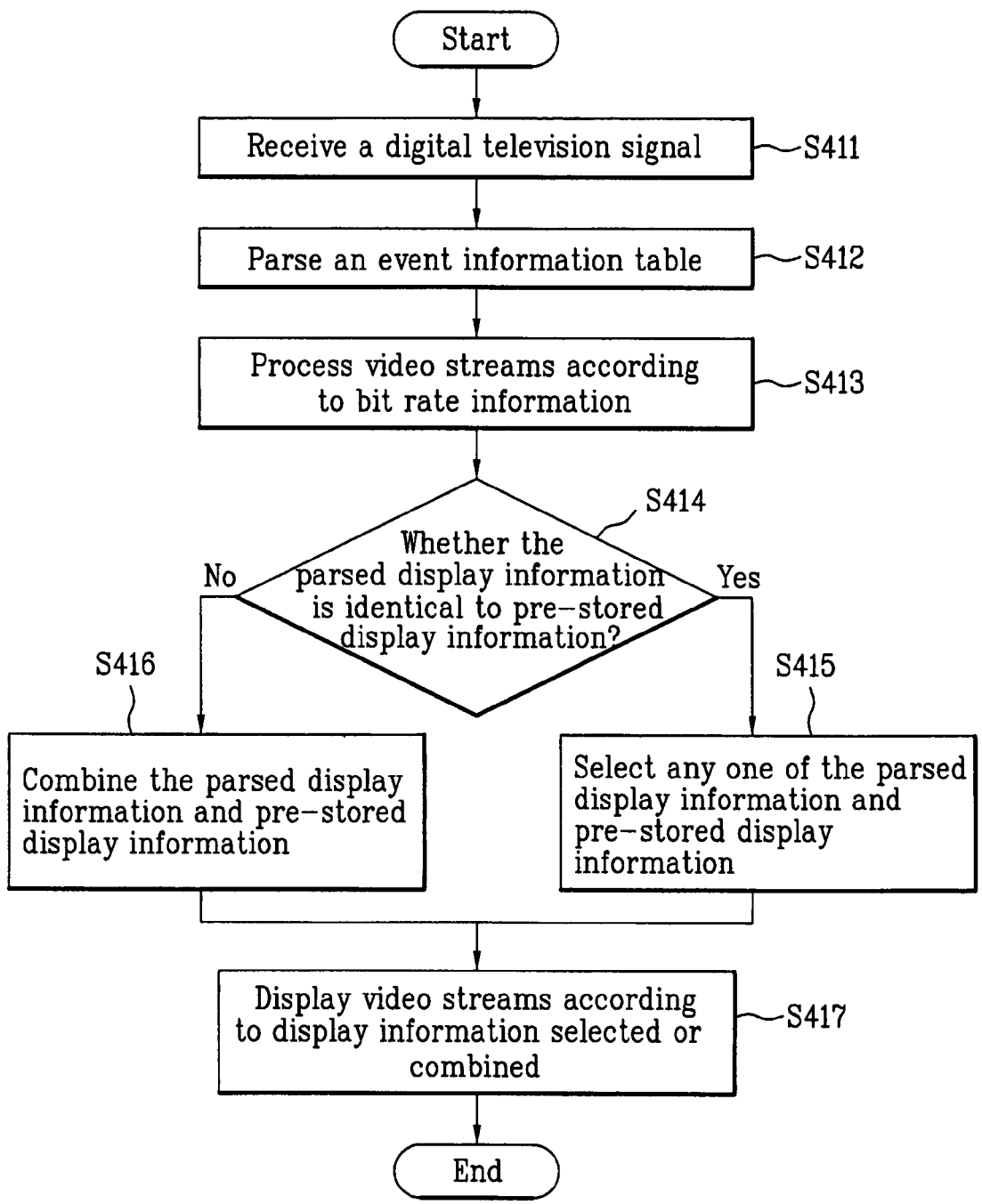

DIGITAL TELEVISION RECEIVER AND METHOD FOR PROCESSING A DIGITAL TELEVISION SIGNAL

This application claims the benefit of Korean Patent Application No. 10-2006-0039050, filed on Apr. 28, 2006, which is hereby incorporated by reference as if fully set forth herein.

BACKGROUND OF THE INVENTION

1. Field of the Disclosure

The present disclosure relates to a digital television (DTV) receiver and a method for processing a DTV signal.

2. Background

In a digital broadcasting environment, a transmitter may transmit a digital television (DTV) signal containing a video stream having a variety of bit rates in order to supply desired broadcasting contents to various consumers having a variety of tastes. A DTV receiver must receive and process the DTV signal containing the video stream having the variety of bit rates.

The present disclosure suggests a method and apparatus for allowing a transmitter and receiver to transmit and receive a DTV signal containing a video stream having a variety of bit rates.

SUMMARY

Accordingly, the present disclosure is directed to a digital television (DTV) receiver and methods for processing a DTV signal that substantially obviate one or more problems described above.

For example, the disclosure may disclose a DTV receiver and methods for processing a DTV signal, by which bit rate information of video streams may be process the DTV signal.

Advantages, objects, and features of the invention in part may become apparent in the description which follows and in part may become apparent to those having ordinary skill in the art upon examination of the following or may be learned from practice of the invention. The objectives and other advantages of the invention may be realized and attained by the structure and processes described in the written description, in the claims, and in the appended drawings.

To achieve these objects and other advantages and in accordance with the purpose of the invention, as embodied and broadly described herein, a method includes receiving a digital television signal including video streams and an event information table carrying information for events on predefined virtual channels; parsing the event information table, the parsed event information table comprising bit rate information defining one or more bit rates associated with video streams in the digital television signal; and processing the video streams according to the parsed bit rate information.

In another aspect, a method includes receiving a digital television signal including video streams and an event information table carrying information for events on predefined virtual channels; parsing the event information table, the parsed event information table comprising first information defining a bit rate of video streams in the digital television signal, second information defining display parameters of the video streams; processing video streams according to the parsed first information; and displaying the processed video streams according to the parsed second information.

In a further aspect, a digital television receiver includes a tuner arranged to receive a digital television signal including video streams; a demodulator arranged to demodulate the digital television signal; a demultiplexer arranged to demultiplex the event information table from the demodulated digital television signal; a decoder arranged to parse the event information table, the parsed event information table comprising bit rate information defining one or more bit rates associated with video streams in the demodulated digital television signal; a processor arranged to process the video streams; and a controller arranged to control operation of the decoder and processor using the bit rate information.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure are incorporated in and constitute a part of this application. The drawings together with the description serve to explain the principle of the invention. In the drawings:

FIG. 1 is an exemplary diagram of a bit stream syntax for event information table;

FIGS. 2A and 2B are an exemplary diagram of the "low_bit_rate_video_stream_descriptor( )";

FIGS. 4A and 4B are an exemplary flowchart of a method for processing a digital television signal.

DETAILED DESCRIPTION

Figure 3:
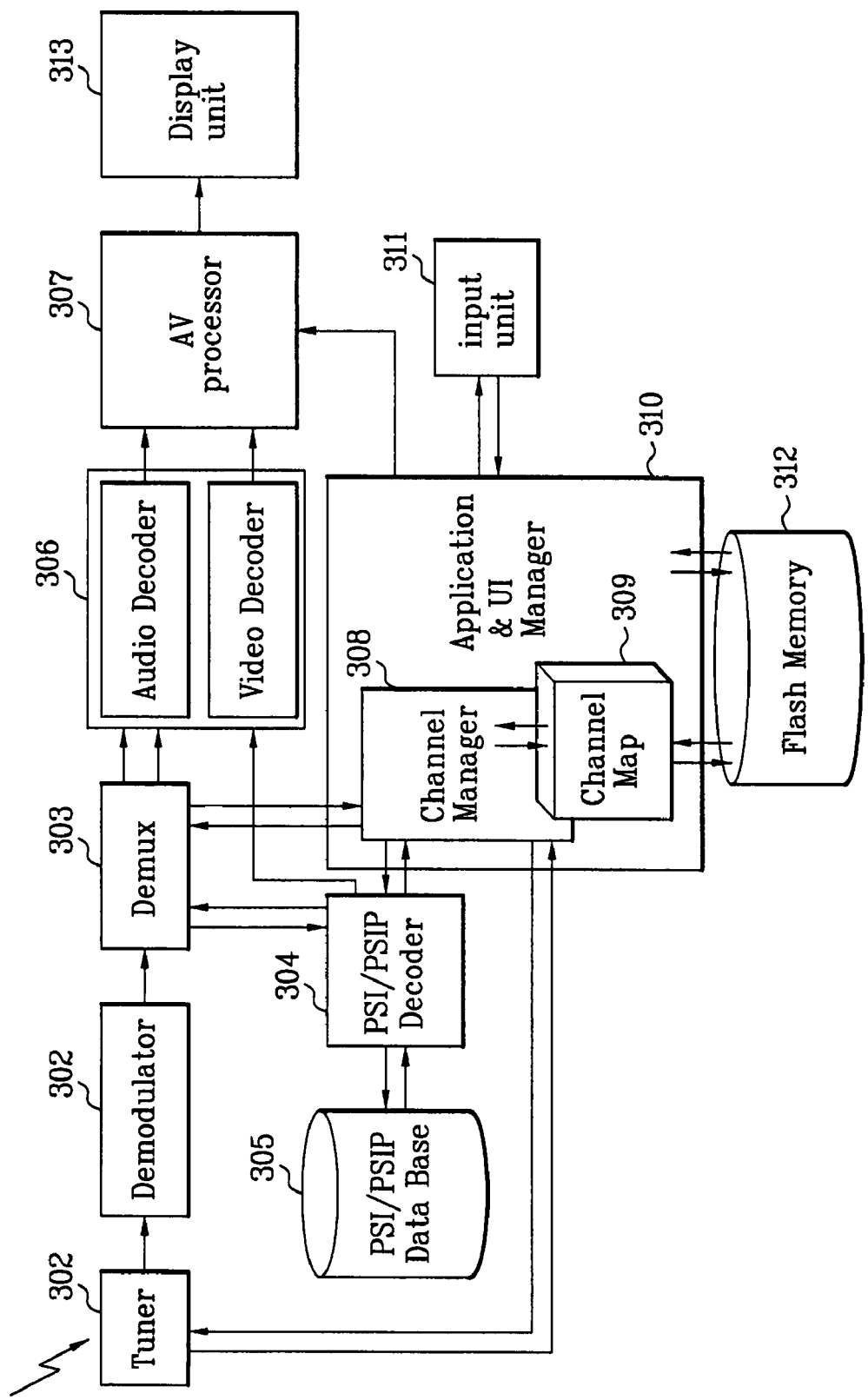
FIG. 3 is a block diagram of an exemplary digital television receiver.

Reference will now be made in detail to a digital television receiver and methods for processing a digital television signal according to the various embodiments, examples of which are illustrated in the accompanying drawings. Wherever possible, the same reference numbers will be used throughout the drawings to refer to the same or like parts for simplicity.

Hereinafter, a digital television (DTV) signal containing bit rate information defining one or more bit rates associated with video streams in the DTV signal and a method and apparatus for processing the DTV signal according to the present disclosure will be described in detail with reference to the accompanying drawings.

(1) Digital Television Signal Containing Information on Video Stream

The present disclosure relates to video streams in the digital television (DTV) signal. The video streams may have a variety of bit rates. Hereinafter, in the present specification, for convenience of description, it is assumed that the video streams have a low bit rate and the DTV signal containing bit rate information on the video streams having the low bit rate is transmitted/received and processed.

The bit rate information on the video streams may be contained in the DTV signal by defining a new program specific information/program and system information protocol (PSI/PSIP) table or containing the information in a predefined PSI/PSIP table.

Hereinafter, in the present specification, it is assumed that the information on the video stream having the low bit rate is contained in an event information table (EIT) of the predefined PSIP table and the information on the video stream is contained in a form of descriptor of the EIT. Alternatively, for example, a program map table (PMT) of the predefined PSI table may be used instead of the EIT.

The video streams having the low bit rate may be transmitted slower than the video streams having a bit rate significantly lower than the bit rate of a standard definition television/high definition television (SDTV/HDTV), for example, original video streams, or have a reduced video size or lower image quality.

FIG. 1 is an exemplary diagram of bit stream syntax for the EIT. For convenience of description, name of fields constructing the syntaxes are marked by double quotation marks.

In the structure of the sections obtained by combining generic data structures, each of all table sections begins at a "table_id" field and finishes at a "CRC_32" field. At this time, each section is divided into a header containing a common form, a message body containing actual data recorded according to a purpose, and a trailer for error checking and correction.

The header includes the "table_id" field to a "protocol_version" field, the message body includes a "num-events_in_section" field, and the trailer includes a "CRC_32" field. In the present disclosure, the EIT sections also include the header, the message body, and the trailer, each of which will be described as follow.

First, the header will be described. A "table_id" is an 8-bit field which should be set to '0xCB', identifying this section as belonging to the EIT. A "section_syntax_indicator" field should be set to '1'. It denotes that the section follows the generic section syntax beyond the section length field. A "private_indicator" field should be set to '1'. A "section_length" field specifies the number of remaining bytes in this section immediately following the section_length field up to the end of the section, including the CRC_32 field. The value of this field should not exceed 4093.

A "source_id" field specifies the source identification of the virtual channel carrying the events described in this section. A "version_number" field is the version number of EIT-i. The version number should be incremented by 1 modulo 32 when any field in the EIT-i changes. Note that the version_number for EIT-i has no relation with that for EIT-j when j is not equal to i. The value of this field should be identical to that of the corresponding entry in a master guide table (MGT).

A "current_next_indicator" is always set to '1' for EIT sections; the EIT sent is always currently applicable. A "section_number" field gives the number of this section. "last_section_number" field specifies the number of the last section. A "protocol_version" is to allow, in the future, this table type to carry parameters that may be structured differently than those defined in the current protocol. At present, the only valid value for "protocol_version" is zero. Non-zero values of "protocol_version" may be used by a future version of this standard to indicate structurally different tables.

Next, the message body will be described. A "num_events_in_section" field indicates the number of events in this EIT section. A value '0' indicates no events defined in this section. An "event_id" field specifies the identification number of the event described. This number will serve as a part of the event ETM_id (identifier for event extended text message). A "start_time" is a 32-bit unsigned integer quantity representing the start time of this event as the number of global positioning system (GPS) seconds since 00:00:00 UTC, Jan. 6, 1980. In any virtual channel, the start_time value of an event should not be less than the end time of the preceding event where the end time of an event is defined to be equal to that event's start_time value plus that event's "length_in_seconds" value.

An "ETM_location" field specifies the existence and the location of an extended text message (ETM). A "length_in_seconds" field is duration of this event in seconds. A "title_length" field specifies the length (in bytes) of the title_text( ). A value '0' means that no title exists for this event. A "title_text( )" field is the event title in the format of a multiple string structure.

A "descriptors_length" field is total length (in bytes) of the event descriptor list that follows. A "descriptor( )" field is one or more descriptors that may be included in the EIT in an iteration of the event "for" loop. The types of descriptors defined for use in the EIT include the content_advisory_descriptor( ), the caption_service_descriptor( ), the audio coding-3 (AC-3) audio_stream_descriptor( ) and the Low_bit_rate_video_descriptor( ).

Finally, the trailer will be described. A "CRC_32" is a 32-bit field that includes the cyclic redundancy check (CRC) value that ensures a zero output from the registers in the decoder after processing the entire EIT section.

Up to now, the EIT section comprising bit rate information defining one or more bit rates associated with video streams in the DTV signal according to the present disclosure was described. Hereinafter, a descriptor containing the information on the video stream is called "low_bit_rate_video_descriptor( )".

FIGS. 2A and 2B are an exemplary diagram of the "low_bit_rate_video_stream_descriptor( )".

An example of the "low_bit_rate_video_stream_descriptor( )" includes bit rate information defining one or more bit rates associated with the video streams in the DTV signal. At this time, the bit rate information may include buffer rate value information defining buffer rate value associated with a buffer included in the DTV receiver. And, the buffer rate value information may include type information defining a type of the video streams in the DTV signal.

The "low_bit_rate_video_stream_descriptor( )" shown in FIG. 2A will be described. A "descriptor_tag" field identifies the type of descriptor. A "descriptor_length" field is an 8-bit count of the number of bytes following the descriptor_length itself.

A "low_bit_rate_video_stream_count" field indicates the number of video streams. A 'for' loop of the "low_bit_rate_video_stream_count" field circulates by the number of video streams.

Next, each field in the 'for' loop will be described. A "bit_rate" field indicates the bit rate value of the video stream in the DTV signal.

As the buffer rate value information, a "low_bit_rate_video_stream_type" field indicates whether the type of the video stream is a full frame or trickle frame. A "max_buffer_rate" field is applied when the type of the video stream is the full frame. When the type of the video stream is the full frame, the video stream has video characteristics close to a moving picture such that the buffer of a receiver has a maximum buffer rate value. A "min_buffer_rate" field is applied when the type of the video stream is not the full frame, that is, the type of the video stream is the trickle frame. When the type of the video stream is the trickle frame, the video stream has image characteristics such that the buffer of the receiver has a minimum buffer rate value.

Therefore, when a transmitter transmits the digital television signal containing the EIT containing the "low_bit_rate_video_descriptor( )" together with the video streams, a receiver parses the "low_bit_rate_video_descriptor( )" and recognizes the bit rate information of the video stream contained in the digital television signal. The receiver determines the type of the video streams having the low bit rate and sets a buffer rate according to the type of the video stream so as to control a buffer included therein to process the received video streams. Accordingly, the DTV receiver can appropriately process the received video streams by preventing the buffer from overflow or underflow using the bit rate information on the buffer control.

The "low_bit_rate_video_stream_descriptor( )" shown in FIG. 2B further includes display information defining display parameters of the video streams in addition to the bit rate information shown in FIG. 2A. For example, the display parameters include at least one of a position, size and aspect ratio of the video streams in the DTV signal. In the description of FIG. 2B, the description of FIG. 2A will be cited with respect to the same portion as FIG. 2A and only different portions will be described.

A "position_LeftTop_XY" field is information providing a reference position at the time of displaying the video streams. A "size_width_height" field is information providing a resolution and screen size (including a width and a height) at the time of displaying the video streams. An "aspect_ratio" field is information providing the aspect ratio of a screen at the time of displaying the video streams.

FIG. 2B is an example where the display information is further included such that a transmitter transmits the DTV signal comprising the video streams having a variety of bit rates and a receiver displays the video streams having the variety of bit rates by referring to the display information.

Also, for example, the DTV receiver determines whether the display information is identical to the pre-stored display information. And, the DTV receiver selects any one of the display information and the pre-stored display information if the display information and the pre-stored display information are identical. At this time, the pre-stored display information may have priority. In contrast, the DTV receiver combines the display information and the pre-stored display information if the display information and the pre-stored display information are not identical.

(2) Apparatus for Processing Digital Television Signal

FIG. 3 is a block diagram of an exemplary digital television (DTV) receiver for processing a DTV signal including bit rate information defining one or more bit rates associated with video streams in the DTV signal. Hereinafter, the DTV receiver according to the embodiment of the present disclosure will be described with reference to FIG. 3.

The DTV receiver includes a tuner 301, a demodulator 302, a demultiplexer 303, a program specific information/program and system information protocol (PSI/PSIP) decoder 304, a PSI/PSIP database 305, an audio/video (A/V) decoder 306, an A/V processor 307, a channel manager 308, a channel map 309, an application and user interface (UI) manager 310, a user input unit 311, a flash memory 312, and a display unit 313.

The tuner 301 tunes a DTV signal in the moving picture experts group-2 (MPEG-2) format. A program specific information/program and system information protocol (PSI/PSIP) table included in the received DTV signal, for example, includes bit rate information defining one or more bit rates associated with video streams in the digital television signal. The tuner 301 is controlled by the channel manager 308 such that the result of the received DTV signal is recorded in the channel manager 308.

The demodulator 302 receives and demodulates the DTV signal tuned by the tuner 301 into a vestigal side band/enhanced vestigal side band (VSB/EVSB) signal.

The demultiplexer 303 demultiplexes an audio, video and PSI/PSIP table from transport packets demodulated by the demodulator 302. The demultiplexing of the PSI/PSIP table is controlled by the PSI/PSIP decoder 304 and the demultiplexing of the audio and video data is controlled by the channel manager 308. When the PSI/PSIP decoder 304 sets a packet identifier (PID) for a desired table as a condition, the demultiplexer 303 filters the sections of the PSI/PSIP table for satisfying the PID and transmits the sections to the PSI/PSIP decoder 304. When the channel manager 308 sets an A/V PID of a corresponding virtual channel as a condition, the demultiplexer 303 demultiplexes an A/V elementary stream (ES) and transmits the demultiplexed A/V ES to the A/V decoder 306.

The PSI/PSIP decoder 304 may parse the PSI/PSIP table, read actual section data, and record the actual section data in the PSI/PSIP database 305. The PSI/PSIP decoder 304 may parse the low_bit_rate_video_descriptor( ) of the filtered event information table (EIT) and store the bit rate information of the video streams in the PSI/PSIP database 305.

The channel manager 308 may request the reception of a channel-related information table by referring to the channel map 309 and receive the result. At this time, the PSI/PSIP decoder 304 controls the demultiplexing of the channel-related information table and transmits a list of A/V PIDs to the channel manager 308. The channel manager 308 may directly control the demultiplexer 303 using the received A/V PID to control the A/V decoder 306.

The application and UI manager 310 may control a graphical user interface (GUI) for displaying the state of the receiver with an on-screen display (OSD).

In particular, the demultiplexer 303 can filter only the header of the table transmitted from the broadcasting station using the PID, the table identification, the version number, the section number, and the table identification extension field. That is, the demultiplexer 303 can filter a desired table sections using the header as described above. For example, the demultiplexer 303 filters the EIT section including the bit rate information of the video stream in the DTV signal according to the present disclosure.

And, the PSI/PSIP decoder 304 parses the filtered EIT and stores the parsed bit rate information in the EIT. At this time, for example, it is assumed that the bit rate information is equal to the defined bit rate information in FIG. 2A. The PSI/PSIP decoder 304 extracts the bit rate information in the PSI/PSIP database 305 and controls the A/V decoder 306 using the extracted bit rate information. That is, the PSI/PSIP decoder 304 controls the A/V decoder 306 to set buffer size as the bit rate value in the extracted bit rate information and to transmit the video streams as the buffer rate value in the extracted bit rate information. And, the A/V processor 307 processes the received video streams from the A/V decoder 306 and transmits the processed video streams to the display unit 313. The display unit 313 displays the processed video streams.

For example, it is assumed that the bit rate information is equal to the defined bit rate information in FIG. 2B. The PSI/PSIP decoder 304 extracts the bit rate information and the display information. The PSI/PSIP decoder 304 controls the A/V decoder 306 to set buffer size as the bit rate value in the extracted bit rate information and to transmit the video streams as the buffer rate value in the extracted bit rate information. The A/V processor 307 processes the received video streams from the A/V decoder 306 and transmits the processed video streams to the display unit 313. And, the display unit 313 displays the processed video streams. At this time, the application and UI manager 310 controls the display unit 313. For example, the application and UI manager 310 receives the extracted display information in the DTV signal and extracts the pre-stored display information by the user. And, the application and UI manager 310 determines whether the received display information from the PSI/PSIP decoder 304 and the pre-stored display information are identical. as the display information received from the PSI/PSIP decoder 304 and display information set by the user as described above.

In the display unit 313, for example, the information "position_LeftTop_XY" may represent the left top coordinate of the video which is currently displayed, and the information "size_width_height" may be used as the width and height information or the resolution information of the video. In addition, the information "aspect_ratio" may represent the information on the aspect ratio of the screen for displaying the video. The display information set by the user may be inputted to the application and UI manager 310 through a menu or a hotkey and the inputted the display information may be stored in the flash memory 312 or an NVRAM.

Since the digital television signal containing the above-described information is transmitted according to the present disclosure, the user may have more options for viewing a video on a television screen and the digital television receiver can efficiently cope with the video control in a variety of broadcasting programs such as data broadcasting programs.

(3) Method for Processing Digital Television Signal

Figure 4A:
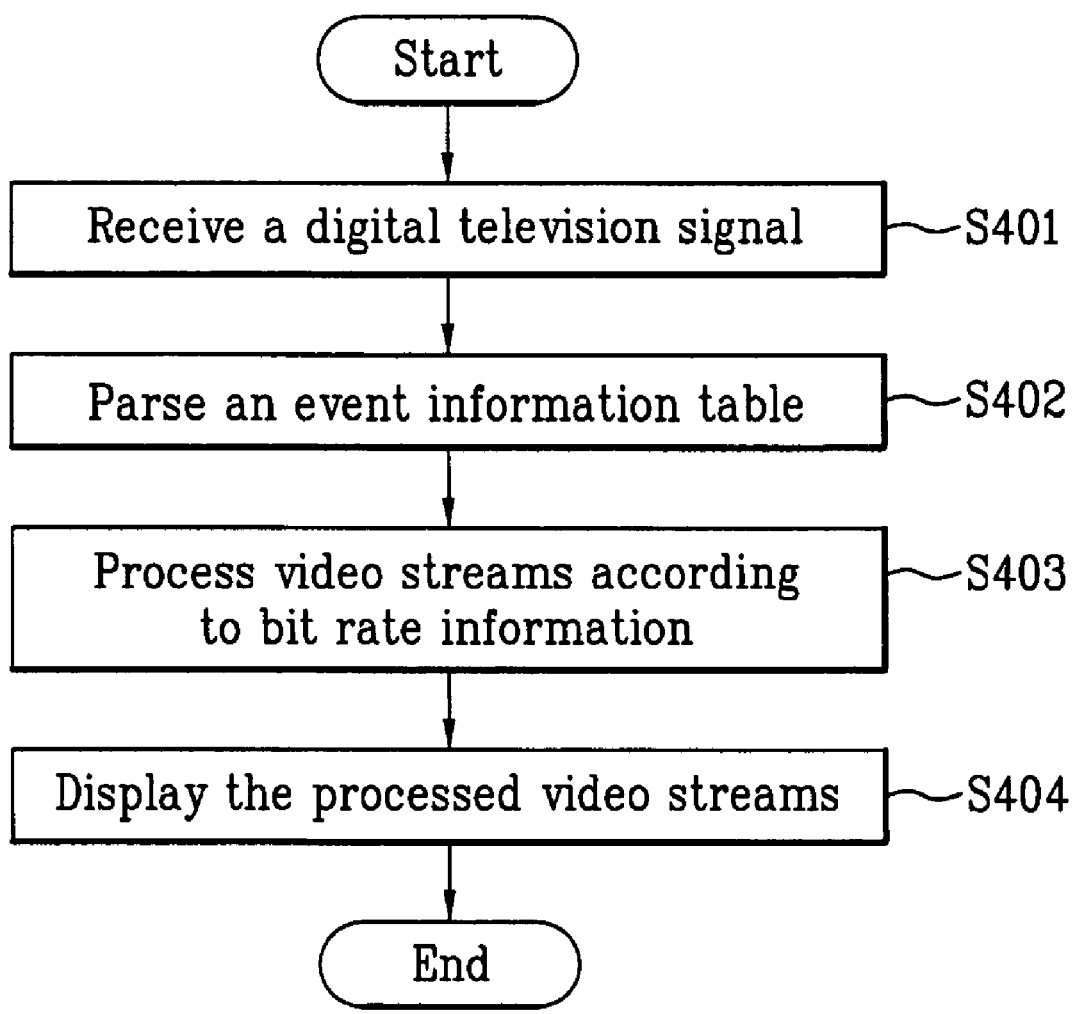

Hereinafter, methods for processing the digital television (DTV) signal in the DTV receiver will be described. FIGS. 4A and 4B are exemplary flowcharts of methods for processing the DTV signal. In the flowcharts, for convenience of description, as described above, it is assumed that the "low_bit_rate_video_descriptor( )" including the bit rate information of video streams in the DTV signal is included in a form of descriptor of the event information table (EIT) section.

First, the flowchart shown in FIG. 4A will be described. At this time, FIG. 4A illustrates a process when the "low_bit_rate_video_descriptor( )" has the configuration shown in FIG. 2A.

The DTV receiver receives the DTV signal including the EIT and filters the EIT section (S401). The DTV receiver parses the filtered EIT, the parsed EIT including bit rate information defining one or more bit rates associated with the video streams in the DTV signal (S402).

The DTV receiver processes the video streams according to the parsed bit rate information (S403). At this time, the bit rate information comprises buffer rate value information defining buffer rate value associated with a buffer included in the DTV receiver. And, the buffer rate value information comprises type information defining a type of the video streams in the DTV signal. Also, the buffer rate value information may be determined in accordance with the type of the video streams. For example, the buffer rate value may be set to a maximum value if the type of the video streams is a full frame. The buffer rate value may be set to a minimum value if the type of the video streams is a trickle frame. Accordingly, the DTV receiver can process video streams having a variety of bit rates in the DTV signal.

Finally, the DTV receiver displays the processed the video streams (S404).

Next, the flowchart shown in FIG. 4B will be described. At this time, FIG. 4B illustrates a process when the "low_bit_rate_video_descriptor( )" has the configuration shown in FIG. 2B.

The DTV receiver receives the DTV signal including the EIT and filters the EIT section (S411). The DTV receiver parses the EIT, the parsed EIT including bit rate information defining one or more bit rates associated with video streams in the DTV signal and display information defining display parameters of the video streams in the DTV signal (S412).

The DTV receiver processes the video streams according to the parsed bit rate information (S413). At this time, the bit rate information comprises buffer rate value information defining buffer rate value associated with a buffer included in the DTV receiver. And, the buffer rate value information comprises type information defining a type of the video streams in the DTV signal. Also, the buffer rate value information may be determined in accordance with the type of the video streams. For example, the buffer rate value may be set to a maximum value if the type of the video streams is a full frame. The buffer rate value may be set to a minimum value if the type of the video streams is a trickle frame. Accordingly, the DTV receiver can process video streams having a variety of bit rates in the DTV signal.

The DTV receiver determines whether the parsed display information is identical to pre-stored display information by a user (414). For example, the parsed display information and the pre-stored display information may include display parameters. At this time, the display parameters includes "position_LeftTop_XY", "size_width_height", and "aspect_ratio" parameter as shown FIG. 2B. Accordingly, the DTV receiver determines whether display parameters of the parsed display information are identical to display parameters of the pre-stored display information.

The DTV receiver selects any one of the parsed display information and the pre-stored display information if the parsed display information and the pre-stored display information are identical (S415). In contrast, the DTV receiver combines the parsed display information and the pre-stored display information if the parsed display information and the pre-stored display information are not identical (S416).

Finally, the DTV receiver display the processed video streams according the selected display information at step 415 or combined display information at step 416 (S417).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital television signal in a digital television receiver, the method comprising:
   receiving at a tuner a digital television signal including a video stream and an event information table carrying information for events on predefined virtual channels;
   parsing at a decoder the event information table, the event information table comprising first information defining a bit rate of the video stream and second information defining a display parameter of the video stream;
   processing at a processor the video stream according to the parsed first information; and
   displaying at a display unit the processed video stream according to the parsed second information.

2. The method of claim 1, wherein the first information comprises buffer rate value information defining a buffer rate value of a buffer included in the digital television receiver.

3. The method of claim 2, wherein the first information further comprises type information defining a type of the video stream.

4. The method of claim 3, wherein the buffer rate value information is determined in accordance with the type of the video stream.

5. The method of claim 4, wherein the buffer rate value information is a maximum value if the type of the video stream is a full frame.

6. The method of claim 4, wherein the buffer rate value information is a minimum value if the type of the video stream is a trickle frame.

7. The method of claim 1, wherein the display parameter is at least one of a position, a size and an aspect ratio of the processed video stream.

8. The method of claim 1 further comprises determining at a controller whether the parsed second information is identical to pre-stored display information.

9. The method of claim 8 further comprises selecting at the controller any one of the parsed second information and the pre-stored display information if the parsed second information is identical to the pre-stored display information.

10. The method of claim 8 further comprises combining at a controller the parsed second information and the pre-stored display information if the parsed second information is not identical to the pre-stored information.

11. A digital television receiver, comprising:
   a tuner arranged to receive a digital television signal including a video stream;
   a demodulator arranged to demodulate the digital television signal;
   a demultiplexer arranged to demultiplex an event information table from the demodulated digital television signal;
   a decoder arranged to parse the event information table, the event information table comprising first information defining a bit rate of the video streams and second information defining a display parameter of the video stream;
   a processor arranged to process the video stream according to the parsed first information;
   a display unit arranged to display the processed video stream according to the parsed second information; and
   a controller arranged to control an operation of the decoder, the processor and the display unit based upon the parsed first information and the parsed second information.

12. The receiver of claim 11, wherein the first information comprises buffer rate value information defining a buffer rate value of a buffer included in the digital television receiver.

13. The receiver of claim 12, wherein the controller controls to set a size of the buffer based upon the bit rate value.

14. The receiver of claim 12, wherein the controller controls to sets a buffer rate of the buffer based upon the buffer rate value information.

15. The receiver of claim 12, wherein the first information further comprises type information defining a type of the video stream.

16. The receiver of claim 15, wherein the type of the video stream is a full frame or a trickle frame.

17. The receiver of claim 16, wherein the buffer rate value is determined in accordance with the type of the video stream.

18. The receiver of claim 17, wherein the controller controls the buffer rate value to set a maximum value if the type of the video stream is a full frame.

19. The receiver of claim 17, wherein the controller controls the buffer rate value to set a minimum value if the type of the video stream is a trickle frame.

20. The receiver of claim 11 further comprising:
   a receiving unit arranged to receive an external input associated with a display parameter of the video stream;
   a storing unit arranged to store the external input.

21. The receiver of claim 20, wherein the controller determines whether the parsed second information is identical to the stored external input.

22. The receiver of claim 21, wherein the controller controls the processor to discard the parsed display information if the parsed second information is identical to the stored external input.

23. The receiver of claim 21, wherein the controller controls the processor to combine the stored external input and the parsed display information if the parsed second information is not identical to the stored external input.

24. The receiver of claim 11, wherein the second information identifies at least one of a position, a size and an aspect ratio of the processed video stream.

* * * * *